This invention relates to a ball bearing nut and screw assembly and more particularly to a ball bearing nut and screw assembly having ball return means and lubricating means.

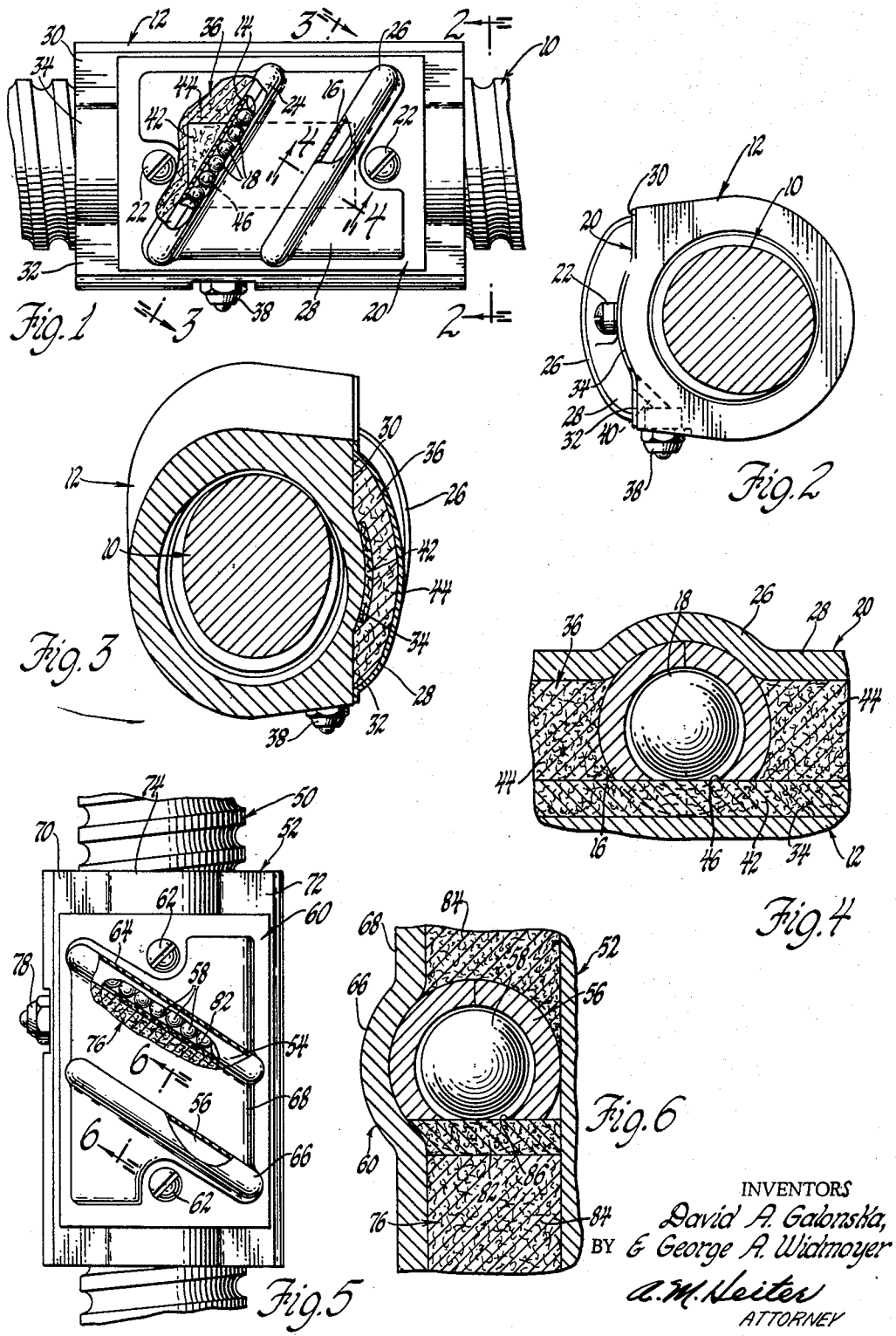
Aug. 25, 1964    D. A. GALONSKA ETAL    3,145,580
BALL BEARING NUT AND SCREW ASSEMBLY
Filed Jan. 29, 1963
INVENTORS
David A. Galonska,
& George A. Widmoyer
BY
ATTORNEY 3,145,580
BALL BEARING NUT AND SCREW ASSEMBLY
David A. Galonska and George A. Widmoyer, Saginaw, Mich., assignors to General Motors Corporation, Detroit, Mich., a corporation of Delaware
Filed Jan. 29, 1963, Ser. No. 254,707
7 Claims. (Cl. 74—459)

In ball bearing nut and screw assemblies having ball return means, there is a problem of adequately lubricating the balls which drivingly interconnect the nut and screw. To maintain the ball bearing nut and screw assembly at peak efficiency, it is desired that the balls and the working race be properly lubricated during operation of the assembly. Conventionally, lubrication of the assembly is provided by applying lubricant external of the assembly to the grooves of the nut and screw or by merely relying on lubrication of the balls and the grooves of the nut and screw prior to final assembly.

With the above in mind, the present invention may be employed in a ball bearing nut and screw assembly having a ball return tube clamped to the nut by a securing member. A cavity formed in the securing member provides an oil reservoir chamber and oil soaked material is contained in the oil reservoir chamber and disposed in an opening in the return tube. The lubricating means are oil soaked material supplying lubricant through the opening to lubricate the balls as they travel through the return tube, the balls thereafter transferring the lubricant to the working race of the nut and screw assembly.

An object of the present invention is to provide in a ball bearing nut and screw assembly having ball return means, lubricating means carried by the nut for lubricating the unloaded balls being returned by the ball return means.

Another object of the present invention is to provide in a ball bearing nut and screw assembly, ball return means including a longitudinal return tube clamped to the nut by a securing member, the longitudinal return tube having an opening and lubricating means disposed in a cavity formed in the securing member and arranged to supply lubricant through the opening to lubricate the balls being returned by the longitudinal return tube.

Another object of the present invention is to provide in a ball bearing nut and screw assembly, a securing member for securing a ball return tube to the nut having a reservoir and lubricating means disposed in the reservoir and in an opening in the return tube, the lubricating means being arranged so as to form a portion of the wall of the return tube.

These and other objects of the invention will be more apparent from the following description and drawings of the preferred embodiments of the invention.

In the drawings:

FIGURE 1 is a partial fragmentary plan view of one embodiment of the ball bearing nut and screw assembly.

FIGURE 2 is a sectional end view taken on the line 2—2 in FIGURE 1.

FIGURE 3 is a sectional view taken on the line 3—3 in FIGURE 1.

FIGURE 4 is an enlarged partial sectional view taken on the line 4—4 in FIGURE 1.

FIGURE 5 is a partial fragmentary plan view of another embodiment of the ball bearing nut and screw assembly.

FIGURE 6 is an enlarged partial sectional view taken on the line 6—6 in FIGURE 5.

FIGURE 1 shows one embodiment of the present invention having a screw 10 and a nut 12 circumjacent the screw 10. The screw 10 and nut 12 have an internal and external matching helical groove respectively and the grooves mate with each other to provide a race. The nut 12 includes two pairs of apertures, not shown, which communicate with the race provided by the matching helical grooves. The apertures accommodate the ends of a pair of longitudinal ball return tubes 14, 16, the return tubes 14, 16 extending diagonally of the body of the nut 12. The return tubes 14, 16 have end portions extending into the race, and the return tubes 14, 16 in conjunction with the race provide a pair of separate continuous ball circuits. Balls 18 are loaded in the race to provide a driving connection between the screw 10 and nut 12 and the end portions of the return tubes 14, 16 deflect or transfer the balls from the race to the return tubes 14, 16. While a pair of return tubes has been shown, it is to be understood that any number of return tubes could be utilized depending on the total length of active race desired or the number of coextensive grooves.

A cap member 20 is secured to nut 12 by suitable securing means such as screws 22 and has return tube securing portions or troughs 24 and 26 which partially encompass return tubes 14, 16 respectively to secure or clamp the return tubes to nut 12. A cavity or depression 28 is formed in cap member 20, and the cap member 20 in cooperation with axial flats 30, 32 and a rounded portion 34 on the nut 12 provide a closed lubricant or reservoir chamber 36. As shown in FIGURE 2, a lubricant supply fitting 38 is provided for supplying lubricant via a bore 40 in nut 12 to chamber 36.

As best shown in FIGURE 3, an oiler pad or lubricant transfer element 42 is disposed in chamber 36 and arranged on the rounded portion 34. An oil reservoir material 44 is disposed in the chamber 36 and in contact with oiler pad 42 and supplies lubricant to oiler pad 42 by capillary attraction.

As best shown in FIGURE 4, each return tube, such as 16, has an opening or cutaway portion 46 extending axially or longitudinally of the return tube and the disposition of the opening 46 and oiler pad 42 is arranged such that a portion of the oiler pad 42 forms a portion of the wall of the return tube 16. Preferably, there is provided sufficient clearance between the balls, the oiler pad 42 and the wall of the return tube so that the oiler pad does not restrict movement of the balls.

In the operation of the assembly if either the nut 12 or screw 10 is held against axial movement and is free to be rotated, the other member will be caused to move linearly if restrained against rotary movement. With the assembly in operation, the continuous train of balls in the working race and return passage are caused to be moved therealong by contact in the working race. At one end of the working race the balls are deflected by one end of the return tubes into the respective return tubes, and move through the return tubes and are returned to the other end of the working race by the other end of the return tubes, the balls thus completing a cycle. As is apparent, the balls moving in the working race are under loaded conditions whereas each of the balls in the return tubes is unloaded and is moved or pushed along the return tube by the preceding balls which are leaving one end of the loaded race. Because of the clearance between the balls and the wall of the return tube, the point contact between the balls causes the balls to stagger as they move through the return tube and contact the oiler pad 42, the balls thereafter transferring a portion of the lubricant they have received from the oiler pad 42 to the helical grooves defining the working race. Because of the staggered movement of the balls through the return tube, contact of the balls with the oiler pad is assured irrespective of whether the ball nut and screw assembly is inverted or the nut is rotated.

The contact of the balls with the oiler pad is preferably dependent on the staggered movement of the balls through the return tube however the influence of gravity acting on the balls while in the return tube can be utilized to aid in contacting the balls with the oiler pad. The embodiment shown in FIGURE 1 is directed to an assembly located in a horizontal position with the return passage on top of the nut which takes advantage of the influence of gravity acting on the balls while they are over the opening in the bottom of the return tube to aid in bringing the balls into contact with the oiler pad.

The oiler pad 42 may be arranged so that a portion is disposed in the opening in each return tube, as the opening 46 in return tube 16, and sufficiently into the path of travel of the balls so that the balls must slightly depress the oiler pad 42 as they pass over the opening in the return tube while traveling through the return tube.

Another embodiment of the invention shown in FIGURE 5 is located in a vertical position. This embodiment shows a vertically positioned ball assembly having a screw 50 and a nut 52 circumjacent the screw 50. A pair of longitudinal return tubes 54, 56 extend diagonally of the body of the nut 52 and in conjunction with the race provided by the matching internal and external helical grooves of nut 52 and screw 50 respectively provide a pair of separate continuous ball circuits for ball travel. A train of balls 58 is mounted in each of the ball circuits and acts to drivingly connect nut 52 to screw 50. A cap member 60 is secured to nut 52 by suitable securing means, such as screws 62. The cap member 60 has return tube securing portions or troughs 64, 66 which partially encompass return tubes 54, 56 respectively to clamp or secure the return tubes to nut 52 and adjacent a rounded portion 74. A cavity or depression 68 is formed in cap member 60 and the cap member 60 in conjunction with axial flats 70, 72 and a rounded portion 74 on the nut 52 provide a closed lubricant or reservoir chamber 76. A lubricant supply fitting 78 is provided for supplying lubricant via a bore in nut 52 to chamber 76.

As best shown in FIGURE 6, a felt oiler pad or lubricated transfer element 82 is disposed in chamber 76 and an oil reservoir material 84 is arranged in chamber 76 adjacent to and in contact with oiler pad 82, the oil reservoir material 84 supplying lubricant to the oiler pad 82 by capillary attraction. Each return tube, such as return tube 56, has on the lower side an opening or cutaway portion 86 extending axially or longitudinally of the return tube 56 and a portion of the oiler pad 82 is disposed in the opening 86 so that in addition to the staggered movement of the balls in the return tube causing the balls to contact the oiler pad, gravity aids in bringing the balls into contact with the oiler pad 82 as the balls pass over the opening 86.

The ball nut and screw assembly arrangements as described provide lubrication of the balls when they are unloaded and the balls after being lubricated act to transfer the lubricant to the working race or active grooves of the nut and screw, the transfer of lubricant to the grooves being effected while the balls are in a loaded condition. The arrangements provide inherent lubricant application advantages in the lubrication of both the balls and the grooves.

Oil absorbent materials such as felt and molded rubber sponge have been found to be suitable for use as oiler pad material and oil reservoir material, however, other suitable oil absorbent materials may be utilized without departing from the teachings of the present invention.

The above-described preferred embodiments are illustrative of the invention which may be modified within the scope of the appended claims.

We claim:

1. A ball nut and screw assembly comprising, a screw having an internal helical groove, a nut circumjacent said screw having an internal helical groove, said grooves mating with each other to provide a race having terminal ends, a train of balls loaded in said race to provide a driving connection between said nut and screw, ball return means secured to said nut providing a confined path for returning the balls from one terminal end to the other terminal end of said race and lubricating means secured to said nut and arranged to cooperate with said ball return means to provide said confined path and to lubricate the balls being returned by said ball return means.

2. A ball nut and screw assembly comprising, a screw having an external helical groove, a nut circumjacent and axially moveable relative to said screw having an internal helical groove, said grooves mating with each other to provide a race having terminal ends, return passage means operatively interconnecting said terminal ends so that said return passage means in conjunction with said race provide a continuous ball circuit for ball travel, a continuous train of balls mounted in said continuous ball circuit and moved therealong by contact with said grooves upon relative movement between said nut and screw and being loaded while moving along said race and unloaded while moving along said return passage means, and lubricating means arranged to cooperate with said return passage means to provide said continuous ball circuit and to lubricate the balls while they are unloaded.

3. A ball nut and screw assembly comprising, a screw having an external helical groove, a nut circumjacent said screw and having an internal helical groove, said grooves mating with each other to provide a race having terminal ends, a train of balls loaded in said race to provide a driving connection between said nut and screw, ball return means secured to said nut for returning the balls from one terminal end to the other terminal end of said race, said ball return means including a longitudinal return tube having an opening therein and lubricating means adjacent the opening in said longitudinal return tube arranged to supply lubricant through said opening to lubricate the balls being returned by said longitudinal return tube.

4. A ball nut and screw assembly comprising, a screw having an external helical groove, a nut circumjacent and axially moveable relative to said screw having an internal helical groove, said grooves mating with each other to provide a race having terminal ends, a train of balls loaded in said race to provide a driving connection between said nut and screw and being moved along said race upon relative movement between said nut and screw, ball return means operatively connected to said nut returning the balls from one terminal end to the other terminal end of said race whenever there is relative movement between said nut and screw, said ball return means including a longitudinal return tube having a longitudinal opening therein, lubricating means secured to said nut arranged adjacent the longitudinal opening in said longitudinal return tube such that as the balls are returned by said longitudinal return tube they contact said lubricating means and are lubricated, the balls thereafter transferring the lubricant added thereto to said grooves.

5. A ball nut and screw assembly as defined in claim 4 wherein said lubricating means comprise a felt oiler pad for transferring lubricant to the balls returned by said longitudinal return tube, and lubricant storing reservoir means arranged to contact said belt oiler pad supplying the lubricant stored therein to said felt oiler pad by capillary attraction.

6. A ball nut and screw assembly comprising in combination, a nut, a screw, matching helical grooves in said nut and screw mating with each other to provide a race having terminal ends, a train of balls loaded in said race providing a driving connection between said nut and screw, a return tube interconnecting the terminal ends of said race, said return tube having an opening, a securing member securing said return tube to said nut and having a reservoir adjacent the opening in said return tube, and lubricating means in said reservoir and arranged in the opening in said return tube.

7. A ball nut and screw assembly comprising in combination, a nut, a screw, matching helical grooves in said nut and screw mating with each other to provide a race having terminal ends, a train of balls loaded in the race providing a driving connection between said nut and screw, a return tube interconnecting the terminal ends of said race, said return tube having an opening in its wall intermediate its two ends, a securing member secured to said nut having a troughed portion fitting a portion of said return tube to firmly clamp said return tube to said nut, said securing member being formed to have a cavity, and lubricating means in said cavity and arranged in the opening in said return tube so as to form a portion of the wall of said return tube.

References Cited in the file of this patent

UNITED STATES PATENTS

| | | |
|---|---|---|
| 2,756,608 | Greenough | July 31, 1956 |
| 2,780,943 | Stump | Feb. 12, 1957 |

FOREIGN PATENTS

| | | |
|---|---|---|
| 559,407 | Great Britain | Feb. 17, 1944 |